Nov. 4, 1947.  D. R. LIGH  2,430,129
BALL AND SOCKET GEARING
Original Filed Jan. 13, 1944  2 Sheets-Sheet 1

INVENTOR.
DAVID R. LIGH
BY

Nov. 4, 1947.    D. R. LIGH    2,430,129
BALL AND SOCKET GEARING
Original Filed Jan. 13, 1944    2 Sheets-Sheet 2
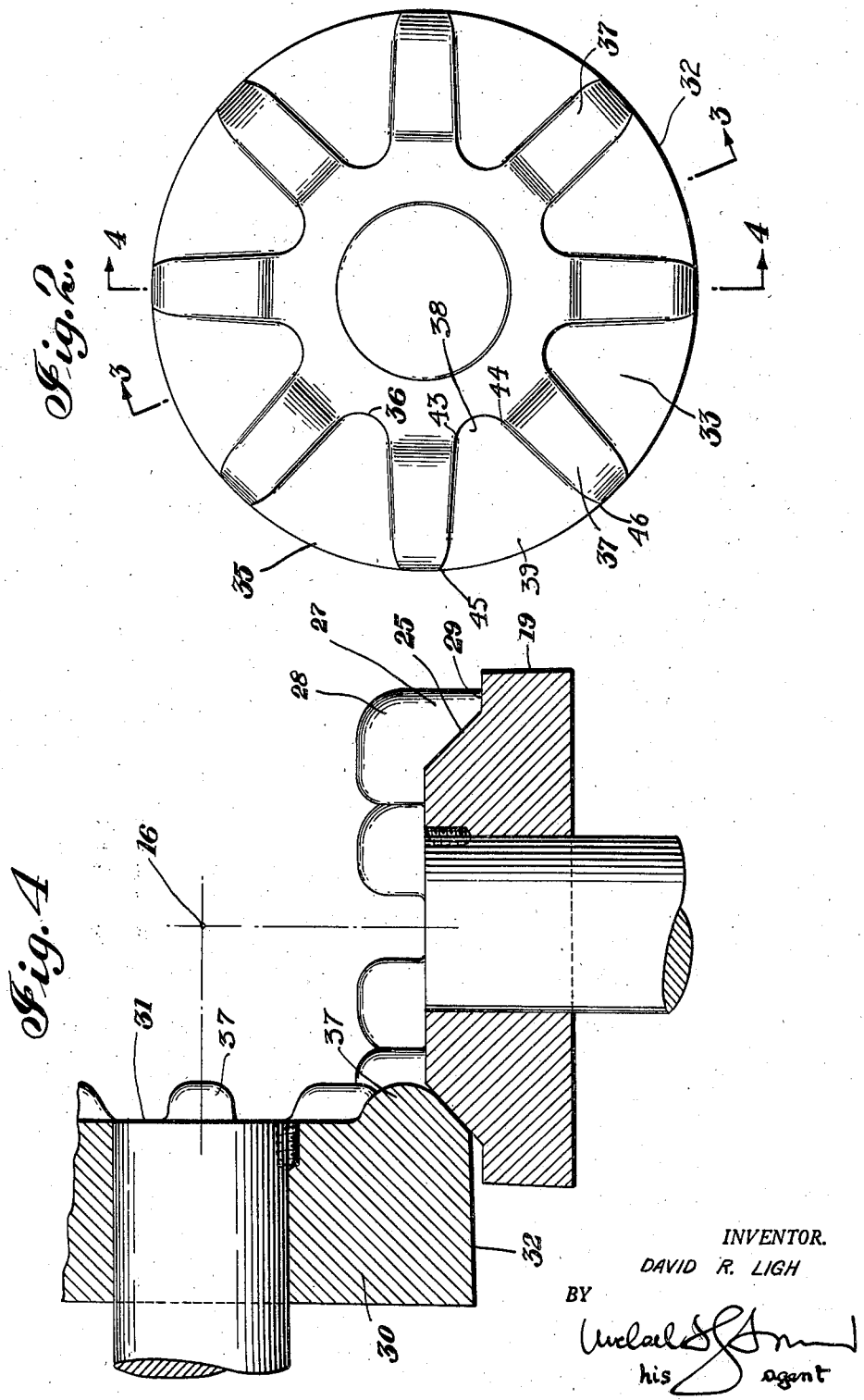
INVENTOR.
DAVID R. LIGH
BY
his agent Patented Nov. 4, 1947

2,430,129

UNITED STATES PATENT OFFICE 2,430,129

BALL-AND-SOCKET GEARING

David R. Ligh, Stamford, Conn., assignor to Darli Industrial Management, Inc., New York, N. Y.

Original application January 13, 1944, Serial No. 518,058. Divided and this application March 5, 1945, Serial No. 581,052

6 Claims. (Cl. 74—416)

1

This application is a division of the U. S. patent application Serial No. 518,058, filed January 13, 1944, entitled "Flexible coupling."

My present invention relates to flexible shaft couplings and more particularly to the construction of male and female gear members for such couplings.

It is an object of my present invention to provide improved flexible couplings which are adapted to transmit relatively great forces.

It is a further object of my present invention to provide flexible shaft couplings in which the motion transmitting gears are only slightly subjected to wear during operation.

It is another object of my present invention to provide a new type of ball and socket gear tooth construction.

It is still another object of my present invention to provide a flexible coupling in which the motion transmitting shafts can be turned relative to each other between two end positions differing from each other by 90° with substantially equal stress on the motion transmitting parts of the gears forming the coupling.

With the above objects in view, my present invention mainly consists of a flexible coupling composed of two shafts, a male gear at the end of one shaft and a female gear at the end of the other shaft; each of these gears comprises a gear body having an at least substantially circular front face and an at least substantially cylindrical peripheral face; the male gear mentioned above is provided with equally spaced elongated projections arranged along the periphery of its front face extending in radial direction thereof and the female gear is provided with equally spaced corresponding elongated depressions along the periphery of its front face extending in radial direction of this face and opening also on the peripheral face of the female gear.

The elongated projections arranged on the front face of the male gear are preferably semi-pear shaped and arranged with their widest parts near the periphery of the front face of the male gear. The term "semi-pear shaped" as used above and in the following description and claims is intended to define a shape obtained by dividing a pear lengthwise; the thus obtained shape will be longitudinal and wider near one end than near the other. Furthermore, it is preferable to make those surface portions of the front face of this male gear which are located between the above mentioned projections inclined toward the peripheral face of this gear so as to improve its mesh with the corresponding female gear.

2

On the female gear, those surface portions of the front face which lie between the above mentioned elongated depressions are slightly raised, thus fitting into the recesses in the front face of the corresponding male gear which are formed by the inclination of this front face along its periphery.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a front view of a female gear;

Figure 1:
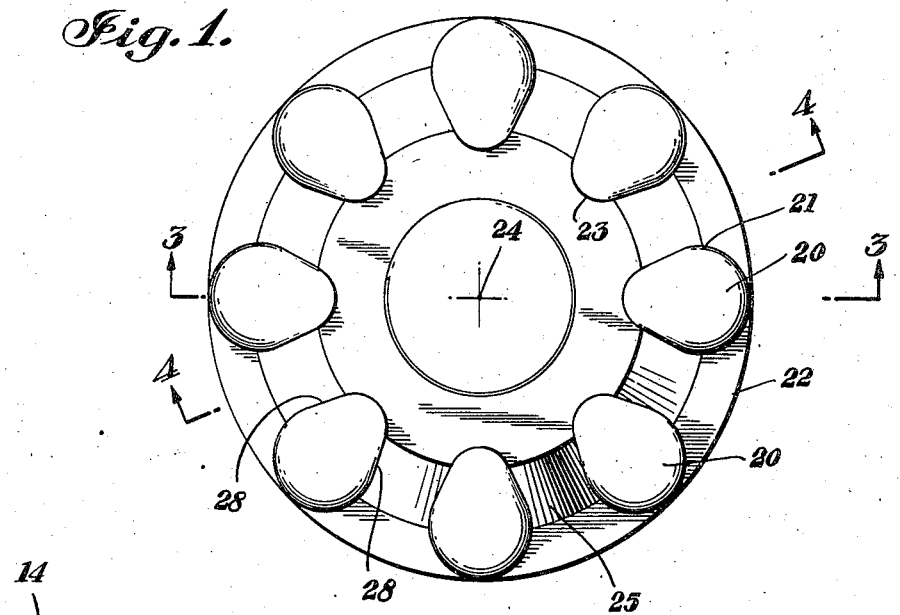
Fig. 1 is a front view of a male gear.
Figure 3:
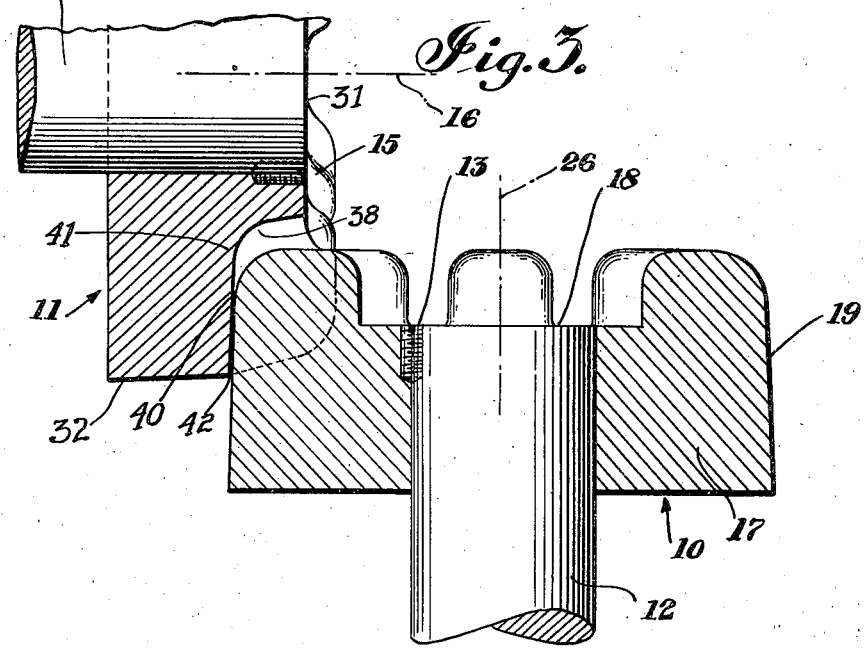

Fig. 3 is a cross section through a male and female gear being in mesh with each other, along lines 3—3 of Figs. 1 and 2; and Fig. 4 is another cross section of a male and female gear being in mesh with each other, along line 4—4 of Figs. 1 and 2.

As shown in Figs. 3 and 4, the new coupling consists of a male gear 10 and a female gear 11 being in mesh with each other. The male gear 10 is secured to the end of shaft 12 by means of screw 13 and the female gear 11 is secured to the end of shaft 14 by means of a screw 15. It is evident and needs no further explanation that the two shafts 12, 13 can be turned relative to each other about a pivoting axis 16 without disengagement of the gears 10 and 11.

The male gear 10 consists of a gear body 17 having a substantially circular front face 18 and an annular or cylindrical peripheral face 19. Substantially semi-pear shaped projections 20 are arranged on front face 18 of the male gear 10 equally spaced from each other, as shown in Fig. 1. The widest portions 21 of these projections 20 are located near periphery 22 of the front face 18.

Furthermore, I wish to mention that these elongated semi-pear shaped projections 20 are arranged in radial direction, i. e. facing with their narrow end 23 the center 24 of front face 18.

As clearly shown in Figs. 1 and 4, the surface portions 25 of front face 18 of the male gear 10 which are located between the projections 20 are inclined toward the peripheral face 19. These surface portions 25 form together a conical surface strip arranged concentrically about the axis 26 of the male gear 10. As indicated in Fig. 4 by numeral 27, this conical surface increases the surface of the side faces 28 of the projections 20, thus enabling better mesh of these projections with the corresponding depressions on the female gear 11. This conical tapered surface 25 might extend to the peripheral face 19; however, in order not to weaken the body 17 of the male gear 10 unnecessarily, I provide adjacent to the peripheral face 19 a face 29 arranged parallel to the front face 18.

The female gear 11 shown in Figs. 2, 3 and 4 comprises also a gear body 30, having a front face 31 and a peripheral face 32. This female gear 11 is provided with depressions 33 arranged in the front face 31 of this gear along the periphery 34 of the same opening on both this front face 31 and the peripheral face 32, as clearly shown in Fig. 3. These depressions 33 are of substantially oblong shape and arranged in the front face 31 along the periphery and entirely below the plane of the same extending in radial direction thereof.

As clearly shown in Figs. 1 and 3, each of these depressions 33 is composed of a substantially cup-shaped inner surface portion 38 and an outer surface portion 39 continually merging into said inner surface portion 38; thus, these inner and outer surface portions form one continuous surface.

As shown in Fig. 3, the depth of the outer surface portion in axial direction of the gear—which depth is determined by the distance between line 40 designating the bottom of the outer surface portion 39 and line 31 designating the front face of gear 11—is substantially equal to the maximal depth of the cup-shaped inner surface portion 38—which maximal depth is determined by the distance between point 41 designating the bottom of the cup-shaped inner surface portion 38 and line 31 designating the front face of gear 11. It is evident from the drawing that these two distances are at least substantially equal to each other, as described above.

Furthermore, the depth of this outer surface portion 39 in axial direction of gear 11 is substantially constant from the inner surface portion 38 to the peripheral face 32 of the gear. This is clearly shown in Fig. 3 in which line 40 designating the bottom of the outer surface portion 39 is substantially parallel to line 31 designating the front face of gear 11 from point 41 where the outer surface portion 39 merges into the inner surface portion 38 to point 42 where the outer surface portion 39 is opening into the peripheral face 32. This is of course a clear indication of the fact that the depth of the outer surface portion 39—determined by the distance of line 40 and line 31 from each other—is substantially constant from point 41 to point 42, i. e. from the inner surface portion 38 to the peripheral face 32.

Furthermore, the outer surface portion 39 of the depression 33 has a width normal to the radial direction in which the depression extends which at the inner end of the outer surface portion 39 where the same merges into the substantially cup-shaped inner surface portion 38 is equal to the width of this inner surface portion 38 and increases toward the outer end 35 of the outer surface portion 39 where the same opens into the peripheral face 32 so that the width of the outer surface portion 39 is substantially greater at the periphery of the front face 31 than where it merges into the inner surface portion 38. This is also clearly shown in Fig. 2, where the distance between points 43 and 44 indicates the inner width of the outer surface portion 39, i. e. its width where it merges into the inner surface portion 38 and the distance between the points 45 and 46 indicates the outer width of the outer surface portion 39, i. e. its width where it opens into the peripheral face 32. Since this distance between the points 45 and 46 is substantially greater than the distance between the points 43 and 44, it is evident that the width of the outer surface portion increases as stated above. Of course, from this fact it also follows that the width of the depression 33 increases from its inner end 36 toward its outer end 35 and at its outer end is about twice as great as near its inner end 36.

These depressions 33 of the female gear 11 engage the projections 20 of the male gear 10 as shown in Figs. 3 and 4. It is evident from these figures that by shaping the depressions and projections as proposed herewith, engagement of the same is greatly improved.

I may also provide between the depressions 33 on the front face 31 of this female gear 11 small slightly raised surface portions 37. During operation of the gears, these raised portions 37 of the front face 31 engage the side faces 28 of the projections 20 on the male gear 10, thereby increasing the motion transmitting contact between the two gears.

I wish to mention explicitly that the single elements of my above described gears have also certain advantages independently from each other: Thus, operative engagement of cooperating gears is increased by shaping the projections 20 in the manner described above, also without providing tapered surface portions 25 between the same; on the other hand, such tapered surface portions 25 on the male gear 10 also have certain advantages in combination with the raised surface portions 37 on the female gear 11, independently from the shape of the projections 20. However, I wish to stress that I have found the combination claimed herewith particularly advantageous and the same constitutes one of the preferred embodiments of my present invention.

It will be understood that each of the elements described above, or two or more together, may also find a useful application in other types of flexible couplings differing from the types described above.

While I have illustrated and described the invention as embodied in ball and socket type of flexible couplings, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What I claim as new and desire to secure by Letters Patent is:

1. A female gear comprising a gear body having an at least substantially circular flat front face and an at least substantially cylindrical peripheral face, said female gear being provided with equally spaced oblong depressions in said front face arranged along the periphery and entirely below the plane of the same and extending in radial direction thereof and having a greater radial dimension than circumferential dimension, each of said depressions having a surface composed of an inner substantially cup-shaped surface portion and an outer substantially conical surface portion merging into one continuous smooth surface, said inner substantially cup-shaped surface portion being located nearer to the center of said front face than said outer substantially conical surface portion which latter is located at the periphery of said front face opening on said front face and also on said peripheral face of said gear.

2. A female gear comprising a gear body having a front face and a peripheral face and being provided with equally spaced oblong depressions in said front face extending in radial direction and arranged along the periphery of said front face and having a greater radial dimension than circumferential dimension, each of said depressions being composed of a substantially cup-shaped inner surface portion and an outer surface portion continually merging into each other, said outer surface portion having a depth being substantially constant from said substantially cup-shaped surface portion to said peripheral face while its width increases from said substantially cup-shaped surface portion to said peripheral face.

3. A female gear comprising a gear body having a front face and a peripheral face and being provided with equally spaced oblong depressions in said front face extending in radial direction and arranged along the periphery of said front face and having a greater radial dimension than circumferential dimension, each of said depressions being composed of a substantially cup-shaped inner surface portion and an outer surface portion continually merging into each other, said outer surface portion having a depth in axial direction of said gear which is at least substantially equal to the maximal depth of said cup-shaped inner surface portion in the same direction and substantially constant from this inner surface portion to the peripheral face of said gear and having a width normal to said radial direction increasing from this inner surface portion to the peripheral face of said gear.

4. A female gear comprising a gear body having a front face and a peripheral face and being provided with equally spaced oblong depressions in said front face extending in radial direction and arranged along the periphery of said front face and having a greater radial dimension than circumferential dimension, each of said depressions having a substantially constant depth which is substantially constant from a point near the inner end of said depression to the outer end thereof and a width increasing from said point near said inner end of said depression to the outer end thereof where said depression is opening in said peripheral face of said gear.

5. A female gear comprising a gear body having a front face and a peripheral face and being provided with equally spaced oblong depressions in said front face extending in radial direction and arranged along the periphery of said front face and having a greater radial dimension than circumferential dimension, each of said depressions being composed of a substantially cup-shaped inner surface portion and an outer surface portion continually merging into each other, said outer surface portion having a depth being substantially constant from said substantially cup-shaped surface portion to said peripheral face and a width normal to said radial direction which is at the inner end of said outer surface portion where the same merges into said substantially cup-shaped inner surface portion equal to the width of said inner surface portion and increases toward the outer end of said outer surface portion where the same opens into said peripheral face so that the width of said outer surface portion is substantially greater at the periphery of said front face than where it merges into said inner surface portion.

6. A female gear comprising a gear body having a front face and a peripheral face and being provided with equally spaced oblong depressions in said front face extending in radial direction and arranged along the periphery of said front face and having a greater radial dimension than circumferential dimension, each of said depressions being composed of a substantially cup-shaped inner surface portion and an outer surface portion continually merging into each other, said outer surface portion having a depth in axial direction of said gear which is at least substantially equal to the maximal depth of said cup-shaped inner surface portion in the same direction and substantially constant from this inner surface portion to the peripheral face of said gear and having a width normal to said radial direction which is at the inner end of said outer surface portion where the same merges into said substantially cup-shaped inner surface portion equal to the width of said inner surface portion and increases toward the outer end of said outer surface portion where the same opens into said peripheral face so that the width of said outer surface portion is substantially greater at the periphery of said front face than where it merges into said inner surface portion.

DAVID R. LIGH.

REFERENCES CITED

The following references are of record in the file of this patent:

UNITED STATES PATENTS

| Number | Name | Date |
| --- | --- | --- |
| 2,378,564 | Ligh | June 19, 1945 |
| 2,315,589 | Brooks | Apr. 6, 1943 |